United States Patent [19]

Williams

[11] Patent Number: 5,706,150
[45] Date of Patent: Jan. 6, 1998

[54] LOW INERTIA FLUX MOTOR ROTARY ACTUATOR

[75] Inventor: Donald Paul Williams, Campbell, Calif.

[73] Assignee: Iomega Corporation, Roy, Utah

[21] Appl. No.: 852,417

[22] Filed: May 7, 1997

Related U.S. Application Data

[63] Continuation of Ser. No. 556,104, Nov. 9, 1995, abandoned.

[51] Int. Cl.$^6$ .................................................. G11B 5/55
[52] U.S. Cl. ............................ 360/106; 360/104; 310/36
[58] Field of Search .................................. 360/106, 104; 310/36

[56] References Cited

U.S. PATENT DOCUMENTS

| | | | |
|---|---|---|---|
| 4,145,725 | 3/1979 | Wallis | 360/106 |
| 4,346,416 | 8/1982 | Riggle et al. | 360/106 |
| 4,742,322 | 5/1988 | Johnson et al. | 335/272 |
| 4,755,908 | 7/1988 | Ycas | 360/106 |
| 4,796,122 | 1/1989 | Levy et al. | 360/98.01 |
| 4,812,932 | 3/1989 | Hishinuma et al. | 360/97.01 |
| 5,041,935 | 8/1991 | Aruga et al. | 360/106 |
| 5,051,669 | 9/1991 | Hsiao et al. | 318/119 |
| 5,184,265 | 2/1993 | Foote et al. | 360/106 |
| 5,247,410 | 9/1993 | Ebihara et al. | 360/106 |
| 5,251,082 | 10/1993 | Elliott et al. | 360/98.07 |
| 5,257,151 | 10/1993 | Cooper et al. | 360/98.07 |
| 5,396,388 | 3/1995 | Brown | 360/106 |

FOREIGN PATENT DOCUMENTS

| | | | |
|---|---|---|---|
| 1-217774 | 8/1989 | Japan | 360/106 |
| 4-337572 | 11/1992 | Japan | 360/106 |
| 6-168550 | 6/1994 | Japan | 360/106 |

OTHER PUBLICATIONS

E. P. Rexford, "High Force Constant Voice Coil Motor For Rapid Seek", IBM TDB, vol. 12 No. 12, p. 2273 May 1970.
Disclosed Anonymously, "Multi-Stack Variable Reluctance Linear Step Motor", Research Disclosure, No. 248, Dec. 1984.

*Primary Examiner*—Stuart S. Levy
*Assistant Examiner*—William J. Klimowicz
*Attorney, Agent, or Firm*—Woodcock Washburn Kurtz Mackiewicz & Norris LLP

[57] ABSTRACT

A rotary actuator which carries magnetic read/write heads into engagement with a magnetic recording medium has a rotor which includes an arm, a pivot assembly and return path members extending from the pivot assembly. The stator includes a permanent magnet, a magnetic member and magnetic coils on the magnetic member. When the magnetic coils are energized, flux flowing through the magnetic member and the return path members aids or detracts from the magnetic flux generated by the permanent magnet.

4 Claims, 2 Drawing Sheets

LOW INERTIA FLUX MOTOR ROTARY ACTUATOR

This is a continuation of application Ser. No. 08/556,104, filed Nov. 9, 1995, now abandoned.

BACKGROUND OF THE INVENTION

This invention relates to a rotary actuator for magnetic disk drives and the like and, more particularly, to a low inertia flux motor in which the coils and the permanent magnet are both on the stator thereby reducing the inertia of the rotor.

Disk drives have an actuator arm which moves magnetic read/write heads into engagement with a recording media, either a flexible disk or a rigid disk.

Rotary actuator disk drives contain an actuator bearing assembly around which an arm, holding the read/write transducer, pivots. Forces (and, therefore, torques) are imparted to the actuator arm by means of an actuator, usually a voice coil motor, or such.

U.S. Pat. No. 4,145,725, Wallis, discloses a rotary actuator, having a stationary magnetic core, a coil and a permanent magnet. "Compliant Anchor for Securing Disk Drive Actuator Bearing," U.S. Pat. No. 5,590,002, filed Jan. 23, 1995 describes a rotary actuator for a disk drive of the type to which the present invention is applicable.

SUMMARY OF THE INVENTION

In accordance with the present invention, the inherent inertia of a rotary actuator is reduced by having both the coil and the permanent magnet on the stator. When the coil is actuated, it creates a magnetic flux in a magnetic member on which the coil is wound. This aids or detracts from magnetic flux created by the permanent magnet. The return path for this flux is completed by return path members on the rotor. The rotor has an actuator arm assembly which carries the magnetic heads. When the coil on the stator is energized to create flux in one direction, the actuator arm assembly moves clockwise or counter-clockwise depending on whether the flux aids or detracts from the flux of the permanent magnet.

Prior art rotary actuators usually have either a coil or a magnet attached to the rotor. By having the coil and the magnet on the stator, the inertia to be rotated during actuator motion is reduced. This provides better seek times and lower vibration sensitivity. Less power to actuate the actuator is required. Additionally, in accordance with the invention, the actuator automatically latches at both ends of the stroke until power is applied to the coils. The actuator arm assembly can be removed easily from the drive.

The foregoing and other objects, features and advantages of the invention will be better understood from the following more detailed description and appended claims.

DESCRIPTION OF THE PREFERRED EMBODIMENT

Figure 1:
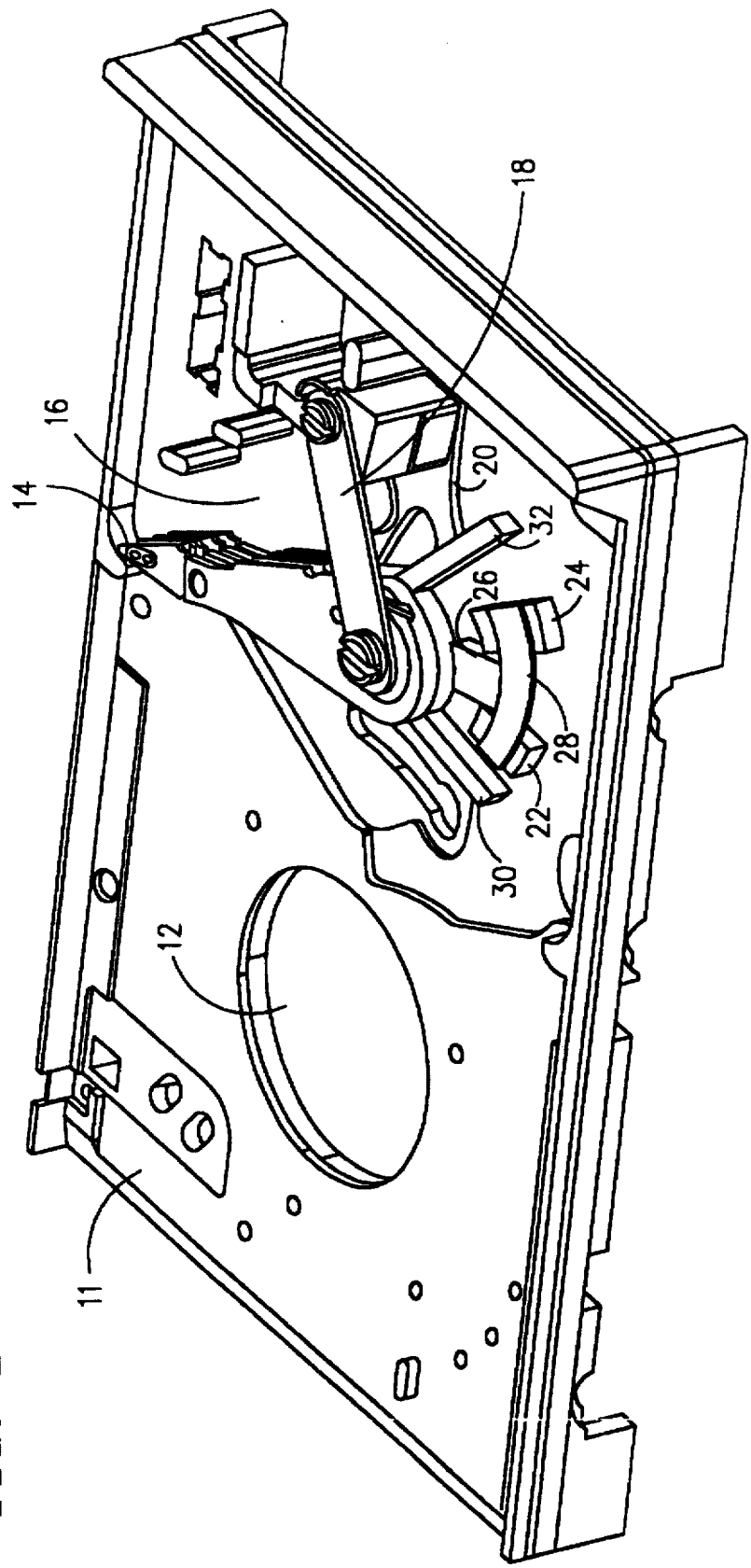
FIG. 1 shows a magnetic disk drive of the type to which the present invention is applicable.
Figure 2:
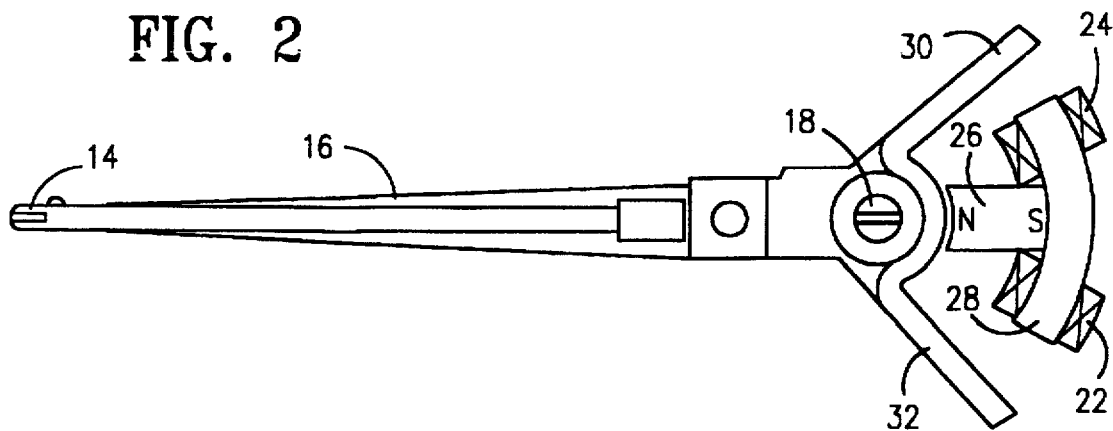
FIG. 2 shows the rotor and stator of the present invention.

FIG. 1 shows a disk drive of the type for use with a cartridge which contains a recording media. The cartridge is inserted into the drive base at 11. A motor at 12 rotates the media by means of a hub rotatably mounted therein to be rotated by the motor.

The disk is engaged by read/write heads 14 which are carried by the arm 16. Arm 16 pivots around a pivot assembly 18 mounted on the baseplate 20. An actuator for rotating the arm includes a voice coil motor with coils 22 and 24.

A permanent magnet 26 is disposed in proximity to the pivot assembly 18. Magnetic member 28, sometimes referred to as back iron, is in proximity to the permanent magnet 26. The coils 22 and 24 are disposed on the magnetic member 28 on opposite sides of the permanent magnet 26.

Two return path members 30 and 32 extend from the pivot assembly 18 so that magnetic flux generated by the coils 22 and 24 flow through magnetic member 28 and return path members 30 and 32 aiding or detracting from the magnetic flux generated by the permanent magnet 26.

Figure 3:
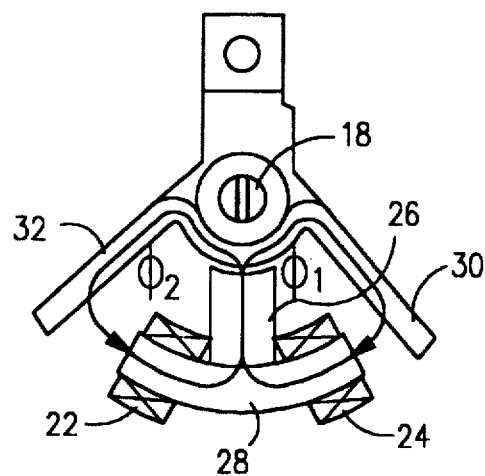
FIG. 3 depicts the stator with the coils energized to create flux in one direction.
Figure 4:
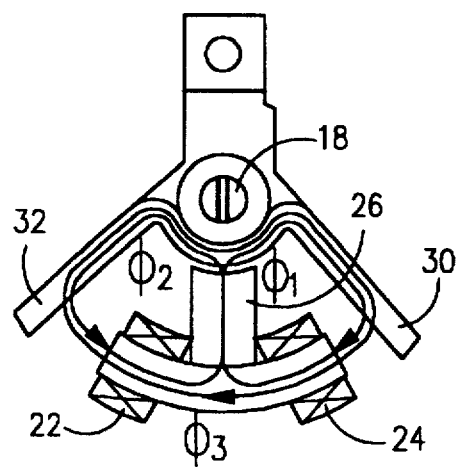
FIG. 4 is the same as FIG. 3 but with the flux in the other direction.

The theory of operation is depicted in FIGS. 3 and 4. FIG. 3 shows the actuator in its unpowered state with the actuator in mid position. The two magnetic flux paths are symmetric so flux $\phi_1$, and $\phi_2$ are the same magnitude. No net torque acts on the actuator. FIG. 4 depicts the actuator with current flowing through the coils in a direction to create flux $\phi_3$. In this case, $\phi_3$ will act to supplement $\phi_1$ and detract from $\phi_2$. The imbalanced fluxes will result in a net torque applied to the actuator.

The pivot assembly 18 can be replaced by a torsion spring in some applications and the dual coils 22 and 24 can be replaced by a single coil by repositioning. Prior an rotary VCMs have either a coil or magnet attached to the rotating actuator. The invention has reduced inertia by having both the coils 22, 24 and the permanent magnet 26 on the stator. The invention also has the advantage that the actuator arm 16 is easily removed from the drive by removal of the screw holding the pivot assembly 18 in place. The coils and permanent magnet remain on the stator assembly while the actuator arm is lifted from the baseplate 20.

While a particular embodiment of the invention has been shown and described, various modifications may be made. All such modifications within the true spirit and scope of the invention are covered by the appended claims.

It is claimed:

1. A rotary actuator for carrying magnetic read/write heads into engagement with a magnetic recording medium comprising:

a rotor having relatively low inertia consisting essentially of:

an actuator arm for said heads, said heads being at one end thereof;

a pivot assembly at the other end of said arm about which said actuator arm rotates; and return path members extending from said pivot assembly, said return path members being of permeable magnetic material which conducts magnetic flux; and a stator including:

a permanent magnet disposed in proximity to said pivot assembly;

a magnetic member in proximity to said permanent magnet; and magnetic coil means on said magnetic member;

magnetic flux generated by said coil flows through said magnetic member and said return path members aiding or detracting the magnetic flux generated by said magnet, whereby said permanent magnet and said coil means are on said stator, not on said rotor, to reduce the inertia of said rotor.

2. The rotary actuator recited in claim 1 wherein said magnetic coil means comprises:

two magnetic coils, said coils being disposed on said magnetic member on opposite sides of said permanent magnet.

3. The rotary actuator recited in claim 1 further comprising:

a baseplate, said rotor being mounted on said baseplate.

4. The rotary actuator recited in claim 3 wherein said rotor is mounted to said baseplate by a screw through said pivot assembly so that said rotor is easily detached and removable from said baseplate and stator.

* * * * *

UNITED STATES PATENT AND TRADEMARK OFFICE
CERTIFICATE OF CORRECTION

PATENT NO. : 5,706,150
DATED : January 6, 1998
INVENTOR(S) : Donald P. Williams

It is certified that error appears in the above-identified patent and that said Letters Patent is hereby corrected as shown below:

Col. 2, line 30, "an" should be --art--.

Signed and Sealed this

Twenty-fourth Day of March, 1998

Attest:

BRUCE LEHMAN

*Attesting Officer*  *Commissioner of Patents and Trademarks*